United States Patent
Hartman

(10) Patent No.: US 10,994,703 B2
(45) Date of Patent: *May 4, 2021

(54) SURFACE WIPER SYSTEM

(71) Applicant: Steam Tech, LLC, Denver, CO (US)

(72) Inventor: Philip Hartman, Windsor, CO (US)

(73) Assignee: Steam Tech, LLC, Denver, CO (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/503,735

(22) Filed: Jul. 5, 2019

(65) Prior Publication Data

US 2019/0389433 A1 Dec. 26, 2019

Related U.S. Application Data

(63) Continuation of application No. 15/194,147, filed on Jun. 27, 2016, now Pat. No. 10,384,654, which is a
(Continued)

(51) Int. Cl.
*B60S 1/38* (2006.01)
*B60S 1/48* (2006.01)
(Continued)

(52) U.S. Cl.
CPC ............... *B60S 1/488* (2013.01); *B60S 1/38* (2013.01); *B60S 1/381* (2013.01); *B60S 1/487* (2013.01);
(Continued)

(58) Field of Classification Search
CPC ............. B60S 1/38; B60S 1/487; B60S 1/524
See application file for complete search history.

(56) References Cited

U.S. PATENT DOCUMENTS 2,576,198 A 11/1951 Stuart
3,793,670 A * 2/1974 Riester .................... B60S 1/522
15/250.04
(Continued)

FOREIGN PATENT DOCUMENTS

CN 203124355 8/2013
CN 103693019 A 4/2014
(Continued)

OTHER PUBLICATIONS

Corresponding European Patent Application No. 11772364.3; Office Action dated Jan. 4, 2019, 8 pages total.
(Continued)

*Primary Examiner* — Michael D Jennings
(74) *Attorney, Agent, or Firm* — Craig R. Miles; CR Miles P.C.

(57) ABSTRACT

A surface wiper device which includes a carrier which supports a blade. The carrier attaches to a wiper arm which urges the blade against and moves the blade across the surface of a windshield. The carrier further provides a plurality of outlets each of which communicate between a hollow passage inside the carrier and a location on the external surface of the carrier. A fluid can be delivered from a fluid source fluidicly coupled to the hollow passage of the carrier under sufficient pressure to be dispersed from the plurality of outlets onto the windshield during movement of the blade. A fluid heater can be thermally coupled with the fluid delivered from the fluid source to the plurality of outlets to increase the temperature of the fluid dispersed onto the windshield. The fluid can be sufficiently heated to generate a heated gas.

16 Claims, 9 Drawing Sheets

Related U.S. Application Data continuation-in-part of application No. 13/642,427, filed as application No. PCT/US2011/000731 on Apr. 25, 2011, now Pat. No. 9,387,831.

(60) Provisional application No. 61/343,068, filed on Apr. 23, 2010.

(51) Int. Cl.
*B60S 1/52* (2006.01)
*B60S 1/54* (2006.01)
*B60S 3/04* (2006.01)

(52) U.S. Cl.
CPC .............. *B60S 1/524* (2013.01); *B60S 1/546* (2013.01); *B60S 3/044* (2013.01); *B60S 1/3801* (2013.01); *B60S 2001/3817* (2013.01); *B60S 2001/3824* (2013.01); *B60S 2001/3832* (2013.01); *B60S 2001/3834* (2013.01); *B60S 2001/3836* (2013.01); *B60S 2001/3837* (2013.01)

(56) References Cited

U.S. PATENT DOCUMENTS

| | | | |
|---|---|---|---|
| 3,881,212 A | 5/1975 | Regler | |
| 5,065,471 A | 11/1991 | Laplante | |
| 5,235,720 A | 8/1993 | Kinder | |
| 5,539,951 A | 7/1996 | Guell et al. | |
| 5,699,581 A | 12/1997 | Heneghan et al. | |
| 5,778,483 A * | 7/1998 | Dawson | B60S 1/38 15/250.04 |
| 5,819,360 A | 10/1998 | Fujii | |
| 5,957,384 A * | 9/1999 | Lansinger | B60S 1/481 219/202 |
| 5,979,010 A | 11/1999 | Dockery et al. | |
| 6,076,216 A | 6/2000 | Biryukov | |
| 6,100,499 A * | 8/2000 | Davila, Sr. | B60Q 1/2684 15/250.04 |
| 6,119,300 A | 9/2000 | Schmid et al. | |
| 6,133,546 A | 10/2000 | Bains | |
| 6,140,608 A | 10/2000 | Stingone, Jr. | |
| 6,199,300 B1 | 3/2001 | Heater et al. | |
| 6,675,434 B1 | 1/2004 | Wilhelm et al. | |
| 6,766,553 B2 | 7/2004 | Wilson | |
| 6,836,924 B2 | 1/2005 | Egner-Walter | |
| 6,892,417 B2 | 5/2005 | Franco et al. | |
| 7,592,537 B1 | 9/2009 | West | |
| 7,707,681 B1 * | 5/2010 | Cabak | B60S 1/38 15/250.41 |
| 8,157,187 B2 | 4/2012 | Shank et al. | |
| 8,225,455 B1 | 7/2012 | Blus et al. | |
| 8,240,320 B2 | 8/2012 | Mertins et al. | |
| 8,301,020 B2 | 10/2012 | Wildegger | |
| 8,381,348 B2 | 2/2013 | Egner-Walter et al. | |
| 8,391,695 B2 | 3/2013 | Arkashevski et al. | |
| 8,550,147 B2 | 10/2013 | Lansinger | |
| 8,726,458 B1 | 5/2014 | Mahr et al. | |
| 8,756,739 B1 | 6/2014 | Potter et al. | |
| 8,771,432 B2 | 7/2014 | Meller et al. | |
| D727,238 S | 4/2015 | Lepper et al. | |
| 9,192,966 B2 | 11/2015 | Zanatta | |
| 9,387,831 B2 | 7/2016 | Hartman | |
| 9,440,621 B2 | 9/2016 | Egner-Walter et al. | |
| 9,443,992 B2 | 9/2016 | Adler et al. | |
| 9,452,736 B2 | 9/2016 | Egner-Walter et al. | |
| 9,511,748 B2 | 12/2016 | Piotrowski et al. | |
| 10,023,154 B2 | 7/2018 | Piotrowski et al. | |
| 10,384,654 B2 * | 8/2019 | Hartman | B60S 1/38 |
| 2002/0066473 A1 | 6/2002 | Levy et al. | |
| 2002/0137455 A1 | 9/2002 | Ivanov et al. | |
| 2003/0177599 A1 | 9/2003 | Wilson | |
| 2004/0045587 A1 | 3/2004 | Franco et al. | |
| 2007/0174989 A1 | 8/2007 | Moll et al. | |
| 2008/0216274 A1 | 9/2008 | Egner-Walter | |
| 2009/0151107 A1 | 6/2009 | Shank et al. | |
| 2009/0172907 A1 | 7/2009 | Egner-Walter et al. | |
| 2009/0283605 A1 * | 11/2009 | Arkashevski | B60S 1/50 239/13 |
| 2010/0037415 A1 * | 2/2010 | Lansinger | B60H 1/242 15/250.01 |
| 2010/0043851 A1 | 2/2010 | Levy et al. | |
| 2010/0293729 A1 | 11/2010 | Lee | |
| 2011/0000525 A1 | 1/2011 | Wu et al. | |
| 2011/0047738 A1 | 3/2011 | Gross et al. | |
| 2011/0073143 A1 | 3/2011 | Levy et al. | |
| 2011/0094542 A1 | 4/2011 | Gonzalez Rodriguez et al. | |
| 2011/0094549 A1 | 4/2011 | Lin | |
| 2011/0126378 A1 | 6/2011 | Ota | |
| 2011/0167577 A1 | 7/2011 | Egner-Walter et al. | |
| 2011/0185531 A1 | 8/2011 | Egner-Walter et al. | |
| 2012/0005855 A1 * | 1/2012 | Egner-Walter | B60S 1/524 15/250.01 |
| 2012/0120641 A1 | 5/2012 | Yassa | |
| 2012/0125367 A1 | 5/2012 | Monkman et al. | |
| 2012/0198646 A1 | 8/2012 | Kempfer et al. | |
| 2012/0285516 A1 | 11/2012 | Mckarris | |
| 2013/0097790 A1 | 4/2013 | Liao | |
| 2013/0240005 A1 | 9/2013 | Ho et al. | |
| 2013/0306106 A1 | 11/2013 | Meller et al. | |
| 2014/0007904 A1 | 1/2014 | Shapira et al. | |
| 2014/0041138 A1 | 2/2014 | Adler et al. | |
| 2014/0082879 A1 | 3/2014 | Criel et al. | |
| 2014/0202492 A1 | 7/2014 | Grossman et al. | |
| 2014/0209145 A1 | 7/2014 | Ting et al. | |
| 2014/0310906 A1 | 10/2014 | Zanatta | |
| 2014/0331434 A1 | 11/2014 | Shimoyama et al. | |
| 2015/0001201 A1 | 1/2015 | Adler et al. | |
| 2015/0258967 A1 | 9/2015 | Lepper et al. | |
| 2015/0349706 A1 | 12/2015 | Grossman et al. | |
| 2016/0304065 A1 | 10/2016 | Hartman | |
| 2017/0093330 A1 | 3/2017 | Castellucci et al. | |

FOREIGN PATENT DOCUMENTS

| | | |
|---|---|---|
| CN | 104307784 | 1/2015 |
| CN | 108832882 | 11/2018 |
| DE | 3309895 | 9/1984 |
| DE | 87 05 413 | 8/1987 |
| DE | 3617395 | 11/1987 |
| DE | 102004036094 | 2/2006 |
| DE | 102008051397 | 4/2010 |
| DE | 102010006531 | 8/2011 |
| EP | 2048455 | 4/2009 |
| EP | 2549199 | 1/2013 |
| EP | 2551610 | 1/2013 |
| EP | 2696150 | 2/2014 |
| GB | 1 432 557 | 4/1976 |
| JP | 05-262206 | 10/1993 |
| JP | 2011036833 | 2/2011 |
| KR | 10-2006-0132893 | 12/2006 |
| WO | WO 2005/075342 | 8/2005 |
| WO | 2007/000346 | 1/2007 |
| WO | WO 2007/015070 | 2/2007 |
| WO | 2008/005361 | 1/2008 |
| WO | WO 2009/013514 | 1/2009 |
| WO | 2010/034447 | 4/2010 |
| WO | 2011/004411 | 1/2011 |
| WO | 2011/133229 | 10/2011 |
| WO | 2012/123979 | 9/2012 |
| WO | 2014/001906 | 1/2014 |
| WO | 2014/022914 | 2/2014 |
| WO | 2014/080399 | 5/2014 |
| WO | 2014/143500 | 9/2014 |
| WO | 2014/163259 | 10/2014 |

(56) References Cited

FOREIGN PATENT DOCUMENTS

| WO | WO 2016/197013 | 12/2016 |
|---|---|---|
| WO | 2017/044270 | 3/2017 |

OTHER PUBLICATIONS

PCT International Patent Application No. PCT/US2011/000731; International Search Report and Written Opinion dated Jan. 18, 2012, 11 pages total.

U.S. Appl. No. 14/846,906, filed Sep. 7, 2015.

International Patent Cooperation Treaty Patent Application No. PCT/US2016/047419; International Search Report and the Written Opinion of the International Search Authority, dated Nov. 4, 2016, 11 pages total.

European Patent Application No. 16844876.9; Extended European Search Report dated Mar. 28, 2019, 10 pages total.

U.S. Appl. No. 61/343,068, filed Apr. 23, 2010.

International Patent Cooperation Treaty Patent Application No. PCT/US2007/015181, filed Apr. 25, 2011.

AUTO123.com. Magic Vision Control from Mercedes-Benz. Website, http://www.auto123.com, originally downloaded May 25, 2012, 3 total pages.

Autovisuals. "Magic Vision Control" in the SL roadster. Website, http://autovisuals.com, originally downloaded May 25, 2012, 9 total pages.

Daimler. The new Mercedes-Benz SL: Lightweight, athletic, luxurious. Website, http://media.daimler.com, originally downloaded May 25, 2012, 1 page.

Just-Auto. Analysis: Mercedes' Magic Vision. Website, http://www.just-auto.com, originally downloaded May 25, 2012, 3 total pages.

Mercedes-Benz. Magic Vision Control adaptive windscreen washing system. Press Information dated Mar. 2012, 3 total pages.

U.S. Appl. No. 13/642,427, filed Oct. 19, 2012.

U.S. Appl. No. 15/194,147, filed Jun. 27, 2016.

Corresponding European Patent Application No. 11772364.3; Office Action dated Aug. 9, 2019, 6 pages total.

PCT International Patent Application No. PCT/US20/12461; International Search Report and Written Opinion of the International Searching Authority dated Mar. 31, 2020, 11 pages.

Corresponding Canadian Patent Application No. 2,807,317; Office Action dated Mar. 1, 2017, 5 pages total.

Corresponding Canadian Patent Application No. 2,807,317; Office Action dated Aug. 29, 2018, 5 pages total.

Corresponding Canadian Patent Application No. 2,807,317; Office Action dated Aug. 15, 2019, 6 pages total.

Corresponding Chinese Patent Application No. 201680051869.6; Office Action dated Jun. 24, 2019, 9 pages total.

Corresponding Korean Patent Application No. 10-2012-13257; Provisional Rejection dated May 30, 2017, 9 pages total.

Corresponding European Patent Application No. 11772364.3; Office Action dated Sep. 29, 2017, 7 pages total.

Corresponding European Patent Application No. 11772364.3; Office Action dated Aug. 14, 2018, 6 pages total.

Corresponding European Patent Application No. 11772364.3; Office Action dated Jan. 22, 2019, 8 pages total.

Corresponding European Patent Application No. 11772364.3; Office Action dated Aug. 19, 2019, 6 pages total.

Corresponding European Patent Application No. 16844876.9; Extended European Search Report dated Mar. 28, 2019, 10 pages total.

Corresponding Mexican Patent Application No. MX/a/2012/012194; Office Action dated Jan. 5, 2017, 3 pages total.

U.S. Appl. No. 13/642,427; Office Action dated Sep. 11, 2014.

U.S. Appl. No. 13/642,427; Office Action dated Jun. 10, 2015.

U.S. Appl. No. 13/642,427; Office Action dated Dec. 18, 2015.

U.S. Appl. No. 15/194,147; Office Action dated Jan. 11, 2019.

U.S. Appl. No. 14/846,906; Office Action dated Feb. 6, 2019.

U.S. Appl. No. 14/846,906; Office Action dated Sep. 17, 2019.

PCT International Patent Application No. PCT/US19/63754; International Search Report and Written Opinion of the International Searching Authority dated Feb. 4, 2020, 12 pages.

* cited by examiner

SURFACE WIPER SYSTEM

This application is the United States National Stage of International Patent Cooperation Treaty Application No. PCT/US2011/000731, filed Apr. 25, 2011, which claims the benefit of U.S. Provisional Patent Application No. 61/343,068, filed Apr. 23, 2010, each hereby incorporated by reference herein.

I. BACKGROUND

Conventional wiper devices and methods of wiping, spray a washer fluid against a windshield or other wipeable surface from an outlet remote from the wiper blade and a wiper blade sweeps across the windshield to remove the washer fluid from the windshield. Even though improvements have been made to these conventional devices substantial problems remain unresolved.

A first substantial problem with conventional wiper devices may be that the washer fluid sprays from a washer fluid outlet remote from the wiper blade or wiper arm. The washer fluid outlet mounted on the vehicle sprays a stream of washer fluid toward the windshield with varying degrees or accuracy depending outlet configuration, movement the vehicle, and other environmental parameters. Additionally, the washer fluid spray may then spread across a portion of the windshield which can obstruct the visual field of the driver.

A second substantial problem with conventional wiper devices may be that the external environment including actual temperature, wind chill, humidity, rain, snow, debris, or the like can effect how the washer fluid sprays from the washer fluid outlet, the washer fluid trajectory, the spray pattern, distribution on the windshield, or the like.

A third substantial problem with conventional wiper devices may be that the washer fluid upon contact with the windshield may spread and freeze, generate glare of incident light, or otherwise obstruct the line of sight.

A fourth substantial problem with conventional wiper devices can be that the amount of washer fluid spreads over the windshield and may not be retained proximate the blade during wiping.

II. SUMMARY OF THE INVENTION

Accordingly, a broad object of the invention can be to provide a wiper device which includes a carrier which supports at least one blade. The carrier attaches to a wiper arm or other fixed or extendable member which can function to urge the blade against or move the blade across the surface of a windshield or other wipeable surface. The carrier further provides one or plurality of outlets each of which communicate between a hollow passage inside the carrier and a location on the external surface of the carrier. A fluid can be delivered from a fluid source fluidicly coupled to the hollow passage of the carrier under sufficient pressure to be dispersed from the one or plurality of outlets onto the windshield or wipeable surface. A fluid heater can be thermally coupled with the fluid delivered from the fluid source to the plurality of outlets to increase the temperature of the fluid dispersed onto the windshield or wipeable surface. The fluid can be sufficiently heated to generate a heated gas which facilitates cleaning of the windshield or wipeable surface.

Another object of the invention can be to provide a method of wiping a wipeable surface with a blade coupled to a carrier which can disperse fluid which depending on the application can be a cooled liquid, ambient temperature liquid, or heated to disperse a vapor or gas, through one or more outlets onto a wipeable surface.

Naturally, further objects of the invention may be disclosed throughout other areas of the specification, drawings, photographs, and claims.

III. A BRIEF DESCRIPTION OF THE DRAWINGS

IV. DETAILED DESCRIPTION OF THE PREFERRED EMBODIMENTS

Figure 1:
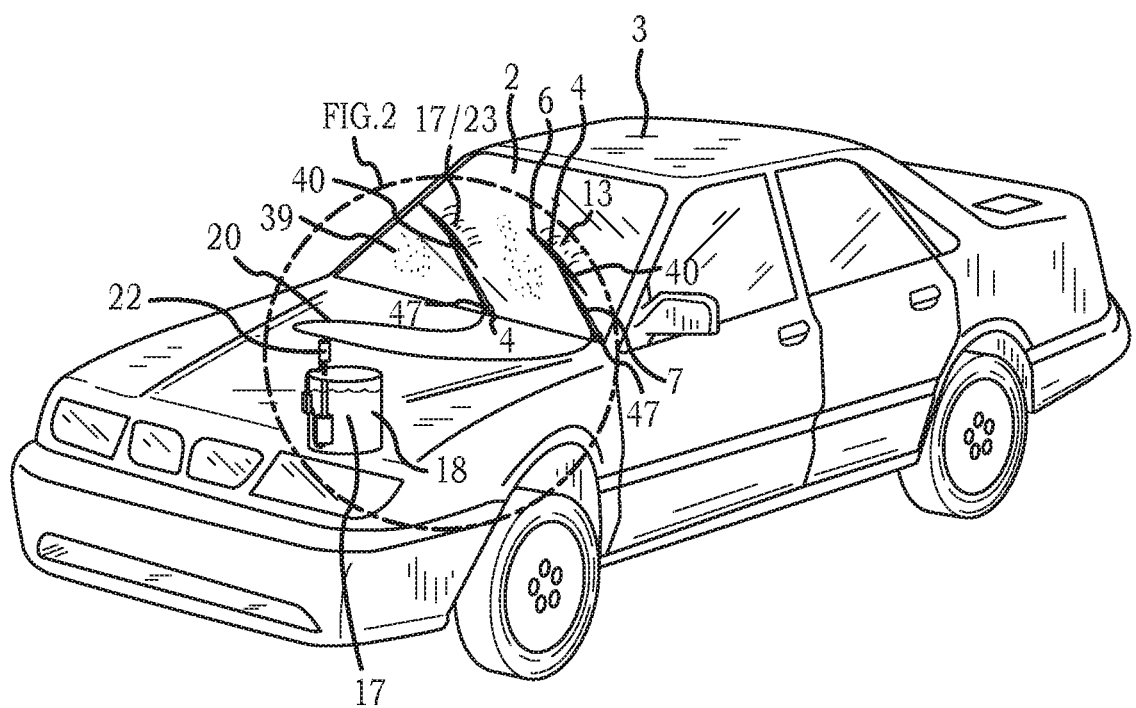
FIG. 1 is an illustration which provides a general overview of particular embodiments of the windshield wiper device.

Now referring primarily to FIG. 1, which provides a general overview of a particular embodiment of the surface wiper system (1) which can be used to wipe a windshield of an motor vehicle (3); however, the invention is not so limited and the surface wiper system (1) can be utilized to wipe any surface to which a blade (4) can be pressed or moved against whether or not the surface of a windshield (2) or wind screen, pane of glass, or the like, and regardless as to whether the surface makes up part of an automobile (3) as shown in FIG. 1, or makes up part of another type of movable vehicle, or part of an stationary object such as the windows of a building, wall surfaces, or the like (a "wipeable surface" (2)).

At least one blade (4) received in a corresponding at least one blade support (5) of a carrier (6)(see for example FIGS. 5 and 6 and 8 and 9) can be pressed against or moved (or both) across the windshield (2) (or wipeable surface) to engage or wipeably engage an amount of wipeable materials (39), such as solids, semisolids or liquids in the form of particulate, sludge, grim, dirt, droppings, sap, rain, cleaners, disinfectants, ice, frost, or the like. The wipeable materials (39) can be moved in whole or in part from that portion of the wipeable surface (2) engaged by the blade (4). At least one blade (4) can be removed from the blade support (5) for replacement by another blade (4).

Now referring primarily to FIGS. 1 through 4, the blade (4) supported by the carrier (6) can be joined proximate a first end (40) to a wiper arm (7). Typically, the wiper arm (7) joins the carrier (6) by a pivot (13) having a location generally on center of the longitudinal axis (41) of the carrier (6). The wiper arm (7) can be configured to urge the blade (4) against or move (or both) the blade (4) across the surface of the windshield or other wipeable surface (2). The carrier (6) can also include sufficient resiliently flexible curvature (42) between a first carrier end (43) and a second carrier end (44) to allow the sweeping surface (8) of the blade (4) to flexibly conform in wiping engagement with the wipeable surface (2) in response to forcible urging upon a central portion of said carrier (6)(see for example FIGS. 9 and 10 which includes a pair of blade supports (65)(66) of a resilient flexible material (45) (such as spring steel) having an amount of resiliently flexible curvature (42) (see FIG. 9) between a first carrier end (43) and a second carrier end (44) which engage a corresponding pair of blades (11)(12). The amount of curvature (42) in the resiliently flexible material (45) can impart a corresponding amount of curvature (42) to each of the pair of blades (11)(12).

Figure 2:
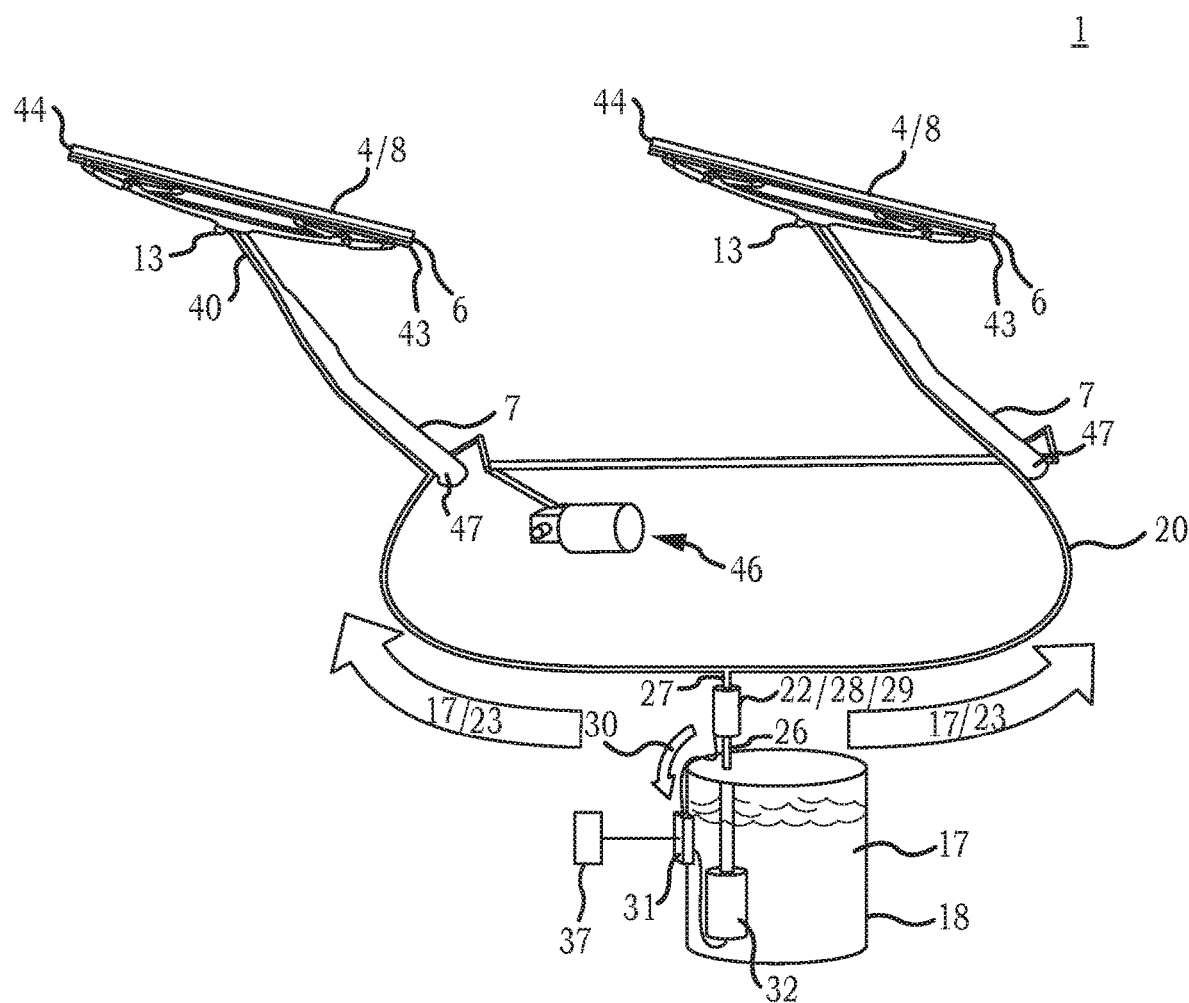
FIG. 2 is an illustration which provides a general overview of the elements included in the fluid path of a particular embodiment of the windshield wiper device.
Figure 3:
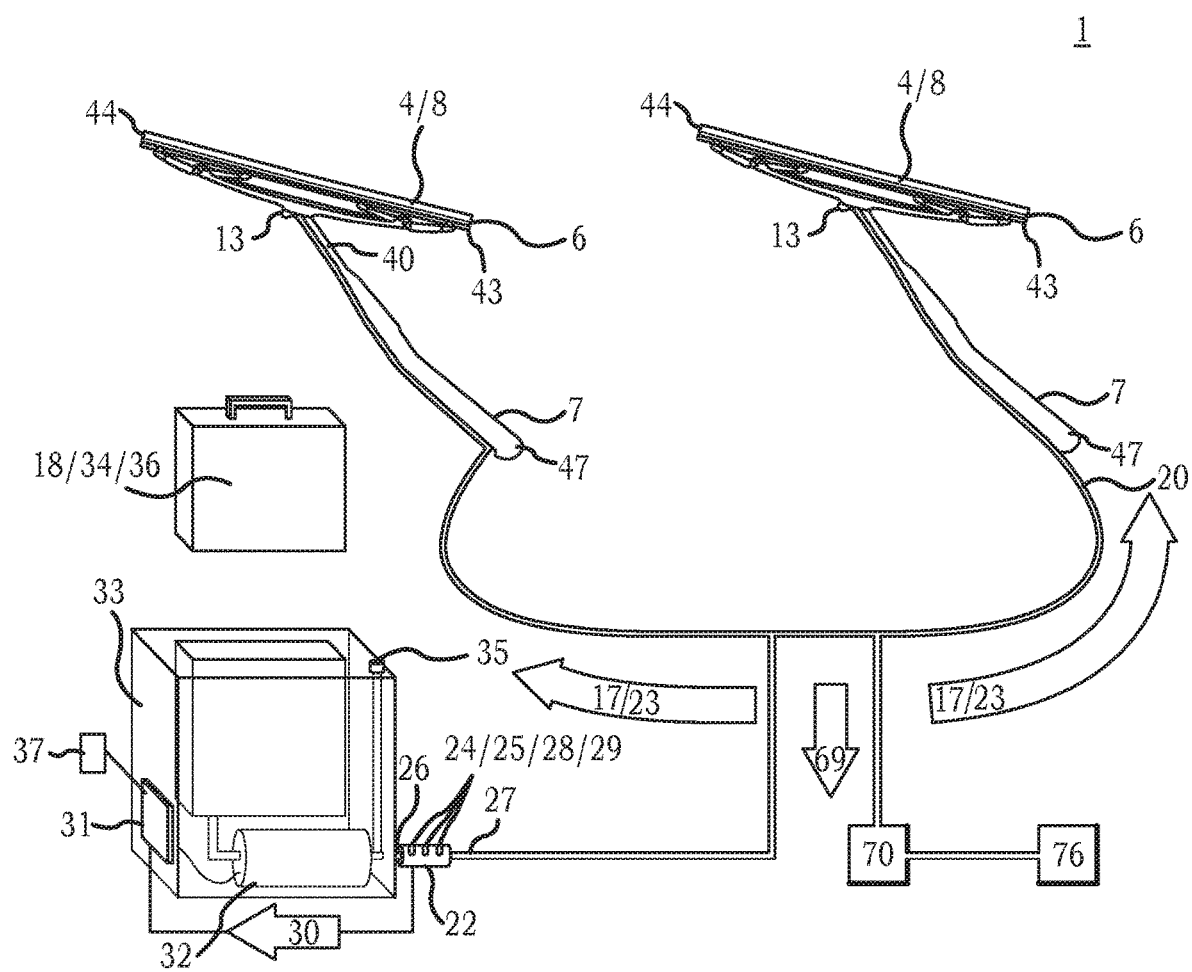
FIG. 3 is an illustration which provides a general overview of the elements included in the fluid path of a particular embodiment of the windshield wiper device.
Figure 4:
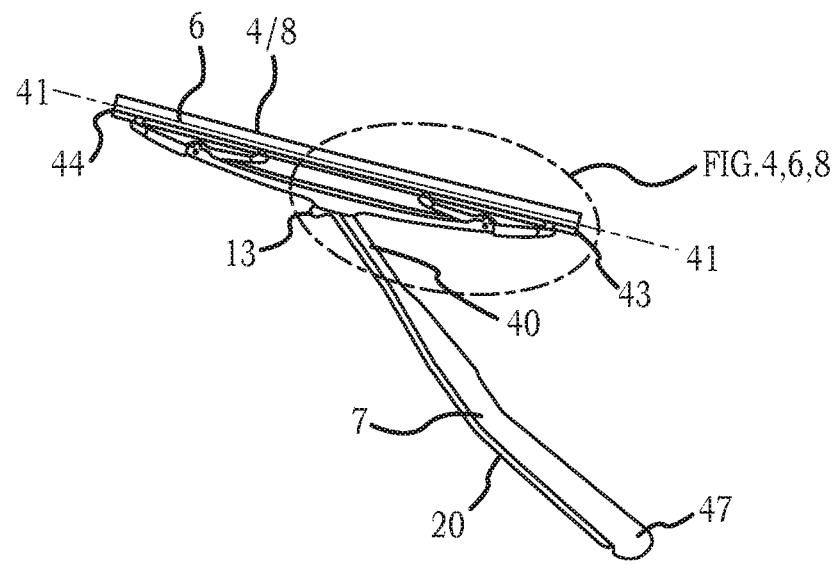
FIG. 4 is an illustration of a particular embodiment of a blade coupled to a carrier correspondingly attached to a wiper arm.
Figure 11:
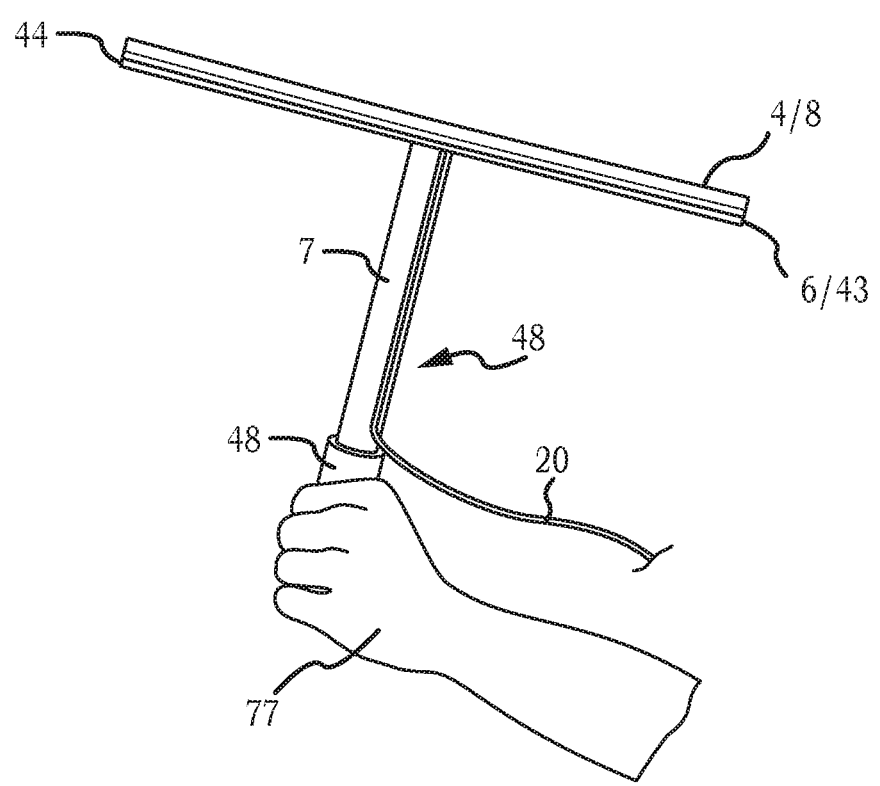
FIG. 11 is an illustration which provides a general overview of a particular embodiment of the windshield wiper device configured to be grippingly engaged by a hand.

Now referring primarily to FIGS. 2 and 3, a movement means (46) can be coupled proximate the second end (47) of the wiper arm (7). The blade (4), wiper arm (7), and movement means (46) can be configured to allow wiping engagement of the sweeping surface (8) of the blade (4) with a wipeable surface (2) during operation of the movement means (46). As to particular applications, such as motor vehicles, conventional wiper arms (7) and conventional movement means (46) can be utilized with particular embodiments of the invention. For example, the second end (47) of the wiper arm (7) can be joined to a motor through a series of mechanical components, conventionally two 4-bar linkages in series or parallel. Motor vehicles with air operated brakes sometimes use air operated wipers, run by bleeding a small amount of air pressure from the brake system to a small air operated motor mounted just above the windscreen. These wipers are activated by opening a valve which allows pressurized air to enter the motor. Motor vehicles with a vacuum manifold can drive a vacuum motor. On the certain motor vehicles, the wiper arm (7) can be driven by a cable connected to the transmission. Certain movement means (46) are not powered, but provide a handle (48) which allows hand power. The handle (48) can be configured for grippable engagement of the hand (77)(see FIG. 11). These examples of the wiper arm (7) and movement means (46) are not intended to be limiting but rather illustrative of the numerous and varied movement means (46) which can be utilized with particular embodiments of the invention. Embodiments of the carrier (6) can be configured to retrofit conventional wiper arms (7) of motor vehicles (3) including the conventional fluid reservoir and fluid pump.

Now referring to the particular embodiments shown in FIGS. 4 through 9, the blade (4) can be configured to provide a sweeping surface (8) which can be urged against the wipeable surface (2). The sweeping surface (8) can extend outwardly from a base portion (9) (also referred to as the "base") which can be secured by the blade support (5) in relation to the carrier (6). As shown by the non-limiting example in FIG. 6, the base (9) of one blade can be centrally coupled along the length of the carrier (6). Alternately, as shown by the non-limiting examples of FIGS. 5 and 9 through 10, the base (9) of a pair of blades (11)(12) can be coupled along the length of the carrier (6) one proximate each carrier edge (10) generally in parallel relation to provide an elongate central area (14) of the carrier (6) disposed between the pair of blades (11)(12). A first end piece (49) can be coupled to the first carrier end (43) in generally perpendicular relation to the surface of the carrier (6). A second end piece (50) can be coupled to the second carrier end (44). Each of the first end piece (49) and the second end piece (50) can extend a sufficient distance from the surface of the carrier (6) proximate each end of the pair of blades (11)(12) to substantially close the perimeter of the elongate central area (14) of the carrier (6). These examples of the invention, however, are not intended to be limiting with respect to the number, configuration or placement of the blades (4) in relation to the carrier (6) and any number, configuration or placement of the blades (4) useful in wiping or other engagement with a wipeable surface (2) can be utilized.

Figure 5:
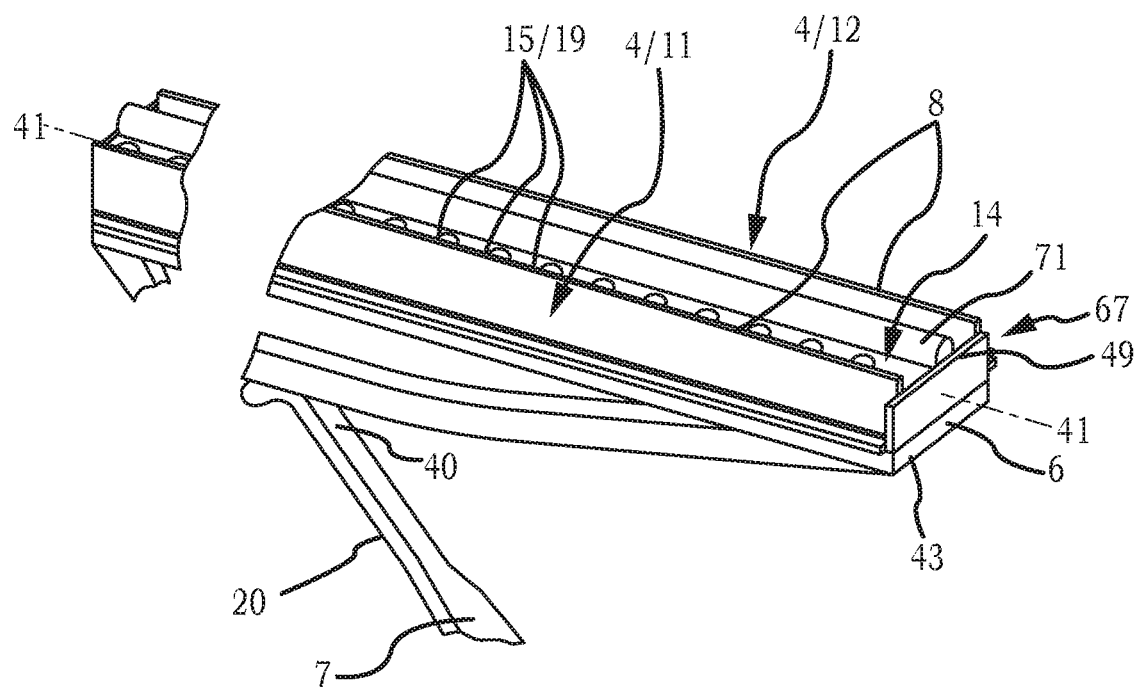
FIG. 5 is an illustration which enlarges a portion of FIG. 4 to show a particular embodiment of the blade and carrier.
Figure 6:
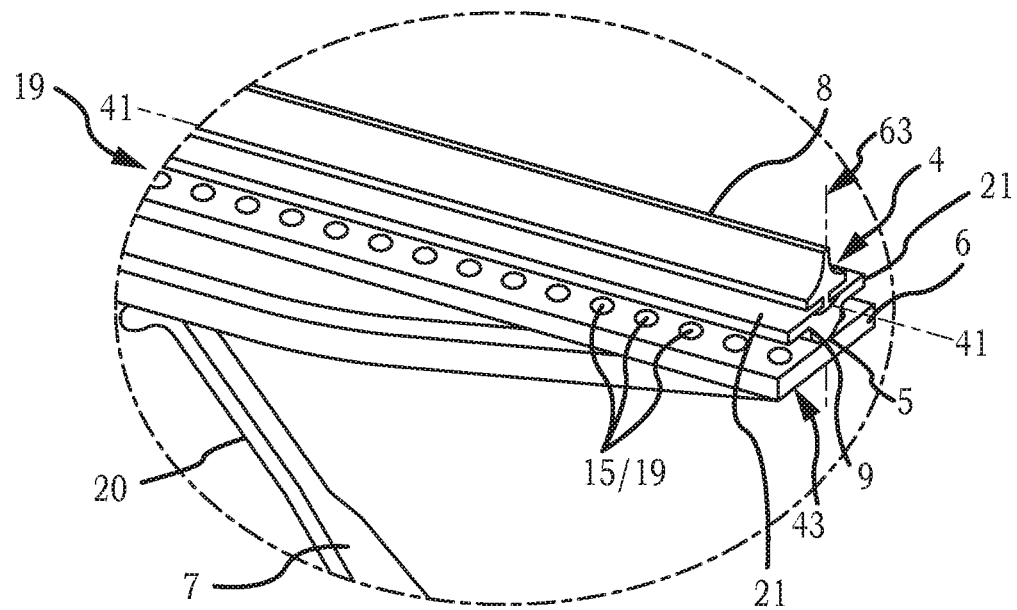
FIG. 6 is an illustration which enlarges a portion of FIG. 4 to show another particular embodiment of the blade and carrier.
Figure 7:
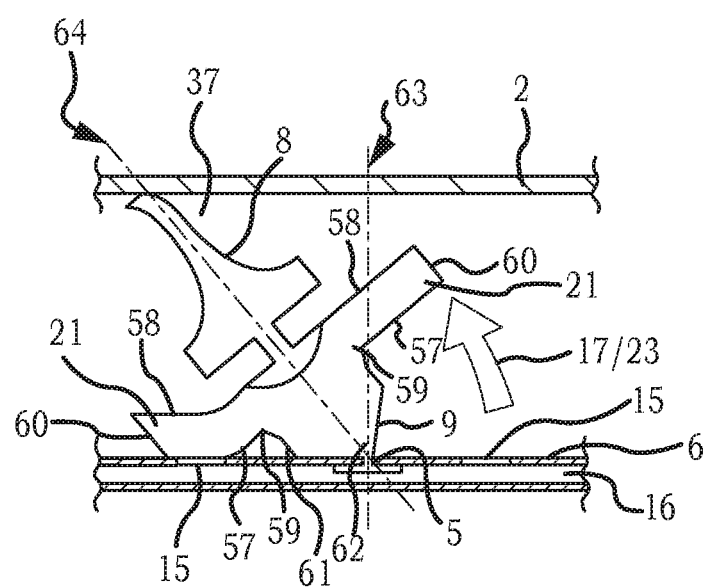
FIG. 7 is a cross section view of the embodiment of the blade and carrier shown in FIG. 6.
Figure 8:
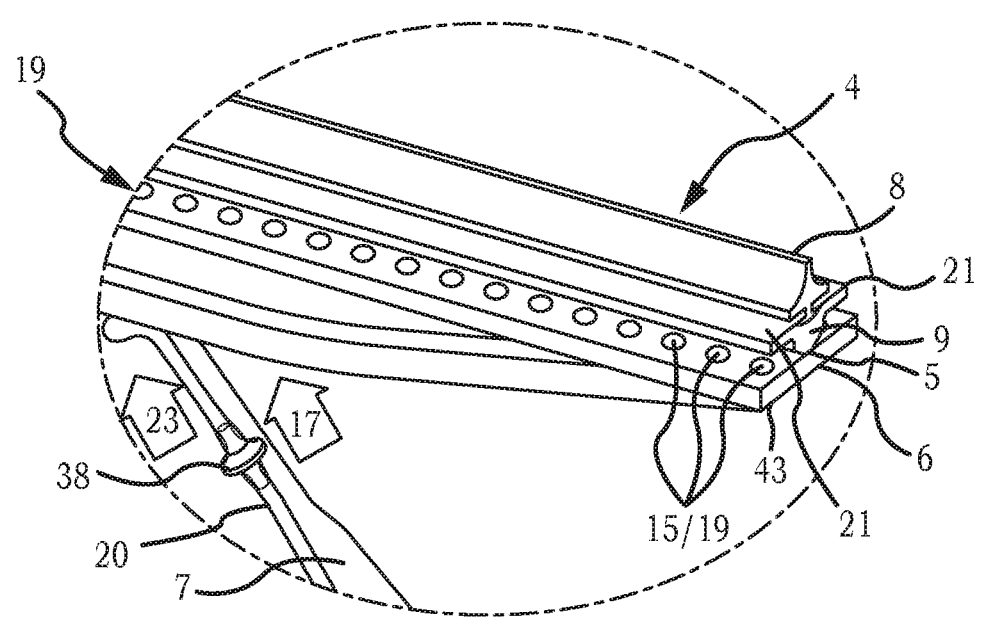
FIG. 8 is an illustration which provides an alternate embodiment of a fluid heater in the form of a catalyst bed fluidicly coupled between a fluid source and the plurality of outlets of embodiments of the carrier.

Again referring primarily to FIGS. 5 through 9, certain embodiments of the carrier (6) can further provide one or a plurality of outlets (15) each of which can communicate between a hollow passage (16) inside the carrier (6) (see for example FIGS. 7 and 10) and a location on the external surface of the carrier (6). As shown in FIGS. 6 through 8, certain embodiments of the carrier (6) can be configured to provide one blade support (5) which supports one blade (4). The blade support (5) can generally extend along the central longitudinal axis (41) of the carrier (6) defining a first side (51) of the carrier (6) in relation to the blade support (5) (or the blade (4)) and a second side (52) of the carrier (6) in relation to the blade support (5). At least one outlet (15) can have a location on the first side (51) of the carrier (6). As to other embodiments, at least one outlet (15) can have a location on the second side (52) of the carrier (6), or can have at least one outlet (15) on the first side (51) of the carrier (6) and at least one outlet (15) on the second side (52) of the carrier (6). As to certain embodiments, the at least one outlet (15) whether located on the first side (51) or the second side (52) can be located in sufficient proximity or adjacent to the blade carrier (5) to allow sealable engagement with an outlet seal (21), as further described below.

Again referring primarily to FIGS. 6 and 8, embodiments can include a plurality of outlets (15) periodically located on the first side (51) of the carrier (6) along the length of the blade support (5) or include a plurality of outlets (15) periodically disposed on the second side (52) along the length of the blade support (5). The plurality of outlets (15) whether disposed on the first side (51) or disposed on the second side (52) of the blade support (5) (or blade (4)) can be located in sufficient proximity or adjacent to the blade support (5) to allow sealable engagement with an outlet seal (21), as further described below.

As to the non-limiting embodiment shown in FIGS. 6 and 8, the plurality of outlets (15) can configured as a linear row (19) in substantially parallel relation to the base portion (9) of the blade (4) or the blade support (5). The plurality of outlets (15) as a linear row (19) can be disposed in relation to the base portion (9) on the first side (51) or the second side (52) of the carrier (6) or disposed in relation to the base portion (9) on both sides (51)(52) of the carrier (6). Again the plurality of outlets (15) whether disposed on the first side (51), the second side (51), or both sides (51)(52) of the carrier (6) in relation to the base portion of the blade (9)(or in relation to the blade support (5)) can have sufficient proximity or can be adjacent to the base portion (9) of the blade (4) to allow operation of the outlet seal (21), as further described below. While the outlets (15) shown in the Figures define circular orifices (53); the invention is not so limited, and the at least one or plurality of outlets (15) may be provided in a numerous and wide variety of configurations depending upon the application.

The base portion (9) of the blade (4) can be dimensionally configured such that within a given range of hardness of a blade material (54) an amount of flexure (55) can be generated in the base (9). The amount of flexure (55) of the base (9) can occur in response to movement of the blade (4) on the windshield or other wipeable surface (2) can generate a useful amount of flexure (55) in the base portion (9) of the blade (4) to maintain the angle of contact (37) of the blade (4) with the windshield (2) or other wipeable surface. The base portion (9) and the sweeping surface (8) of the blade (4) can be produced from a variety of conventional elastomers to provide a sufficient amount of flexure (55), and as non-limiting examples: general purpose rubber such as silicone base rubber, natural rubber, chloroprene rubber, dimethyl silicone raw rubber, methyl vinyl silicone raw rubber, methyl phenyl vinyl silicone raw rubber, fluorosilicone raw rubber, or the like can be used not only as a single material but also as a blended material of two or more than two elastomers or rubbers within the range to satisfy necessary properties.

The hardness of the elastomer after the curing can be in the range of between about 50 and about 80 Durometer Type A as defined by JIS-K6253. As to certain embodiments of the invention, the sweeping surface (8) (or sweeping portion) may function primarily to sweep or move wipeable materials (5) from the windshield (2) or wipeable surface as opposed to cutting or scraping wipeable materials (5) from the windshield (2). While the sweeping property of the blade (4) may deteriorate when the rubber hardness is lower than 50 as well as higher than 80 (embodiments occurring incrementally in the range), the invention is not so limited, and depending upon the application the hardness may be less than 50 or greater than 80.

Now referring primarily to FIGS. 6 through 8, certain embodiments of the blade (4) can further include one or a pair of outlet seal(s) (21) coupled to the base portion (9) of the blade (4). Each outlet seal (21) can have a configuration which upon occurrence of the amount of flexure (55) of the base portion (9) of the blade (4) engages a portion of the external surface of the outlet seal (21) with the at least one outlet (15) or the plurality of outlets (15) on the corresponding first or second side (51)(52) of the carrier (6) in relation to the base portion (9) of the blade (4).

Now referring primarily to FIG. 7 a non-limiting example of an outlet seal (21) can have the configuration of an elongate strip (56) having a first face (57) and a second face (58) and having a first edge (59) and a second edge (60). The first edge (59) can be coupled along the longitudinal length of the base (9) of the blade (4). The second edge (60) can terminate at sufficient distance outward of the base (9) to allow the first face (57) to sealably engage the at least one outlet (15) upon occurrence of the amount of flexure (55) of the base (9). Understandably, an outlet seal (21) can be coupled along the longitudinal length of the base (9) of the blade (4) in whole or in part or to a first base side (61) or to a second base side (62) or both sides (61)(62) of the base (9) and while the Figures show an outlet seal (21) coupled to both sides (61)(62) of the base (9); the invention is not so limited.

In the unflexed condition (63) of the base portion (9) of the blade (4) as shown in FIG. 6, the outlet seal (21) can extend a distance outward from the base portion (9) with the first face (57) generally in parallel relation to the surface of the carrier (6). In the flexed condition (64) of the base (9) of the blade (4) as shown in FIG. 7, which can occur during movement of the sweeping surface (8) of the blade (4) across the surface of the windshield (2)(or other wipeable surface (2)), a portion of the first face (57) of the outlet seal (21) can be forcibly urged against the external surface of the carrier (6) to sealably engage all or a portion of the plurality of outlets (15). The term sealably engage for the purposes of this invention means engagement which can prevent or reduce the flow of an amount of fluid (17) from one or more of the plurality of outlets (15).

Figure 9:
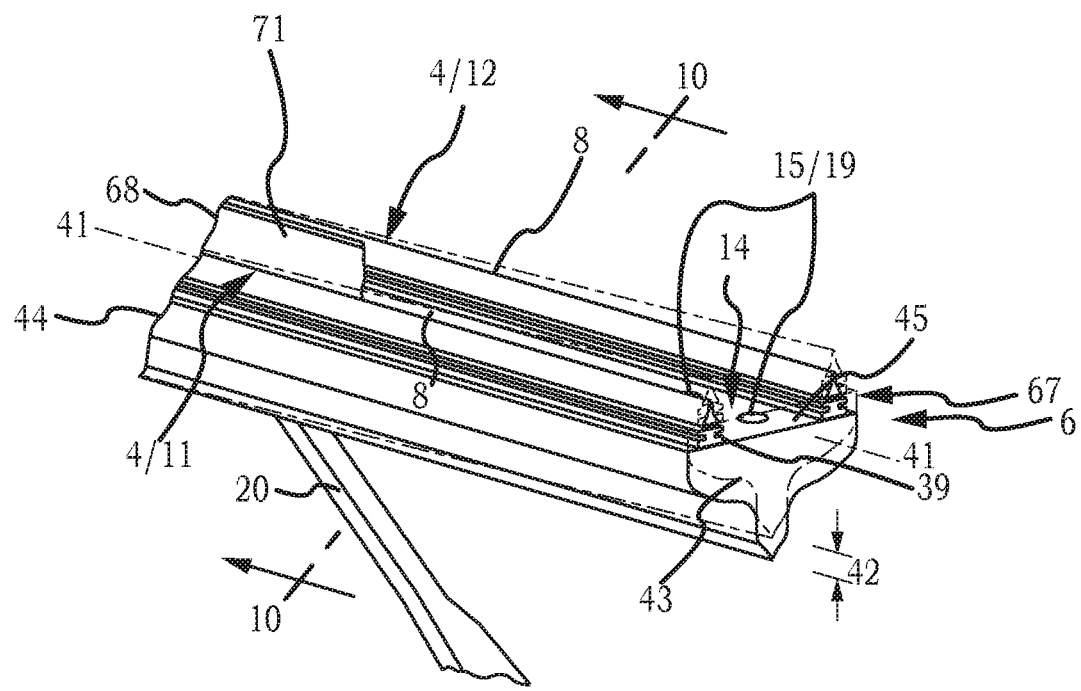
FIG. 9 is an illustration which enlarges a portion of FIG. 4 to show a particular embodiment of the blade and carrier.
Figure 10:
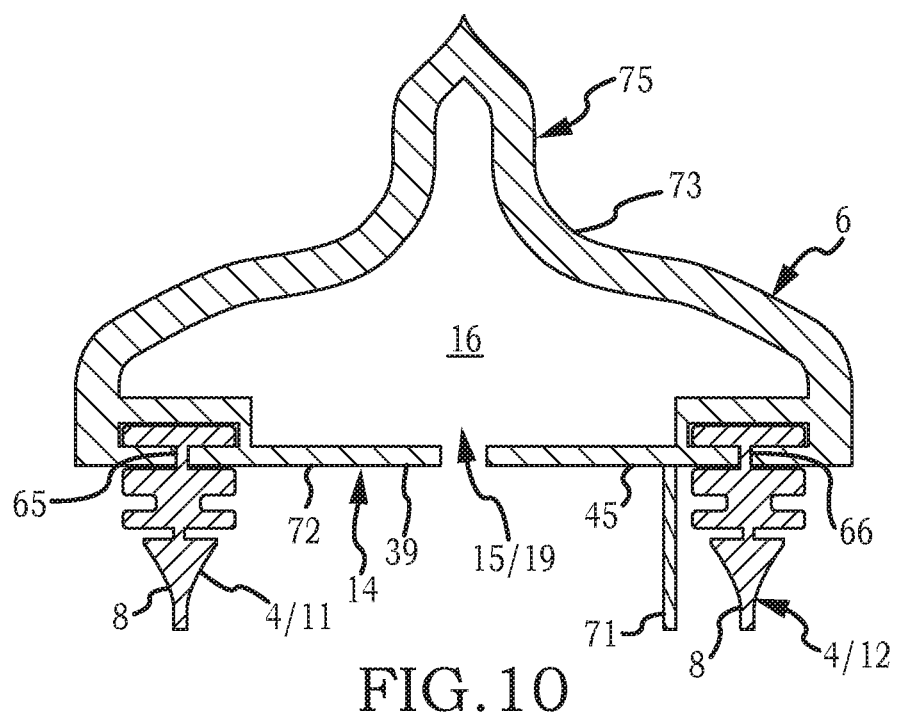
FIG. 10 is a cross section view of the embodiment of the blade and carrier shown in FIG. 9.

Now referring primarily to FIGS. 5 and 9, a non-limiting embodiment of the invention can include a pair of blade supports (65)(66) which extend generally in parallel relation along the longitudinal length of the carrier (6). Each of the pair of blade supports (65)(66) can be correspondingly coupled to one of a pair of blades (11)(12). An elongate central area (14) of the carrier (6) can be disposed between the pair of blades (11)(12). At least one outlet (15) or a plurality of outlets (15) can be located or periodically located whether or not aligned in a linear row (19) between the pair blade supports (65)(66) along the length of the carrier (6). A first end piece (49) can be correspondingly coupled to a first carrier end (43) of the carrier (6) and a second end piece (50) correspondingly coupled to the second carrier end (44) of the carrier (6). Each end piece (49)(50) can extend a distance upward from the surface of the carrier (6) adjacent a corresponding pair of blade ends (67)(68) to substantially enclose the perimeter of the elongate central area (14). The substantially enclosed perimeter of the elongate central area (14) can be urged against the wipeable surface (2) to substantially enclose the amount of fluid (17) delivered from the outlets (15) forgoing exposure to the ambient environment. As to certain embodiments, a vacuum (69) can be generated by a vacuum generator (76) (such as a vacuum pump or the like) at one or more outlets (15) to collect the amount of fluid (17) and deliver the amount of fluid (17) to a waste container (70)(see as a non-limiting example FIG. 3). Embodiments of the invention having a pair of blades (11)(12) with or without end pieces (49)(50) which dispose at least one or a plurality of outlets (15) between the pair of blades (11)(12) can confer an advantage in that an amount of fluid (17) dispersed from the outlets (15) can be retained proximate the blades (11)(12) (and the wipeable surface (2)) for a period of time which may be greater than that of conventional blades or one bladed (4) embodiments of the invention. Additional cleaning elements (71) can be disposed within the elongate central area (14) including, additional blades, sponge elements, scraper elements, or the like.

Now referring primarily to FIGS. 1 through 3, an amount of fluid (17) can be delivered from one or more fluid sources (18) fluidicly coupled to the hollow passage (16) of the carrier (6) under sufficient pressure to be dispersed from one or plurality of outlets (15). The amount of fluid (17) can be dispersed from the at least one outlet (15) onto the windshield (2) or wipeable surface (2) during wiping engagement or movement of the blade (4). The fluid (17) can be any fluid compatible with and flowable from the fluid source (18) through the hollow passage (16) of the carrier (6) and dispersed through one or a plurality of outlets (15). As non-limiting examples, the amount of fluid (17) can be water, alcohol, detergent, surfactant, cleaners, disinfectants, or the like whether individually or in various permutations and combinations. Depending on certain factors relating to the amount of fluid (17) such as density and viscosity and depending upon the amount to be dispersed from one or more outlets (15) over a period of time the dimensional relations of the fluid source (18), conduits (20) and the plurality of outlets (15) can be adjusted to disperse a sufficient amount of fluid (17) from the plurality of outlets (15) for a particular application. As to certain embodiments, the hollow passage (16) can comprise a plurality of hollow passages (16) each fluidicly coupled to one or more outlets (15) with each of the plurality of hollow passages (16) coupled to one or more than one fluid source (18). Each fluid source (18) can contain different fluids (17) which can be correspondingly dispersed from different outlets (15).

While various embodiments of the invention are shown in the Figures as having a carrier (6) configured as a generally flat rectangular elongate member defining within a hollow passage (16); the invention is not so limited, and the carrier (6) can have a wide variety of configurations capable of supporting the blade (4) and providing the hollow passage (16) through which fluids (17) can be dispersed. The carrier (6) can have a substantially rigid fixed configuration or sufficient flexure to assist in engaging the blade (4) with the wipeable surface (2). Now referring to FIGS. 9 and 10, a pair of blade supports (65)(66) can be disposed in a substantially flat bottom portion (72) of the carrier (6). The flat bottom portion (72) of the carrier (6) can provide sufficient resiliently flexible curvature (42) between the first carrier end (43) and the second carrier end (44) to allow the sweeping surface (8) of the blade (4) to flexibly conform in wiping engagement with the wipeable surface (2) in response to forcible urging upon a central portion of the carrier (6), as above described. The top portion (73) of the carrier (6) can be configured to with a greater or lesser amount of surface area (74) and extending a greater or lesser distance from the bottom portion (72) of the carrier (6) to generate an amount of aerodynamic force based on the velocity of the carrier (6). The aerodynamic forces can be assistive in forcibly urging the blade (4) against the wipeable surface (2). The top portion (73) as to certain embodiments can be configured as an airfoil (75) to distribute air flow about the carrier (6) in manner which directs aerodynamic forces through the carrier (6) to the blades (4) or a pair of blades (11)(12). The blade (4) and the carrier (6) may further provide a level of transparency which can afford a line of sight through the carrier (6).

Again referring primarily to FIGS. 1 through 3, embodiments of the invention can further provide a fluid heater (22) thermally coupled with the amount of fluid (17) delivered from the fluid source (18) to the plurality of outlets (15). The fluid heater (22) can increase the temperature of the amount of fluid (17). The heated amount of fluid (17) can be dispersed onto the windshield (2) or other wipeable surface. As to certain embodiments of the invention, the fluid (17) can be sufficiently heated to be dispersed from the plurality of outlets (15) of the carrier (6) in whole or part as a heated gas(es) (23) such as an amount of water converted to an amount of steam.

Now referring primarily to FIGS. 2 and 3, the fluid heater (22) can take a numerous and wide variety of forms. As one non-limiting example shown in FIG. 3, a housing (24) can be provided with one or more separate serially connected heating chambers (25) defining a fluid (17) flow path from an inlet port (26) to an outlet port (27). Each heating chamber (25) can be provided with one or more electric immersion heating element(s) (28) and can further provide a temperature sensor (29) for producing a signal (30) indicative of the fluid (17) temperature in that heating chamber (25). The heating element (28) of each heating chamber (25) can be independently controlled by a control system (31) responsive to signals (30) from each of the temperature sensors (29) and the signal (30) so that the heating element (28) in a heating chamber (25) can be energized only if the sensed fluid temperature in that heating chamber (25) is less than the desired outlet port (27) temperature. The number of heating elements (28) energized can be regulated to the flow rate, necessary or desired fluid temperature and heating capability of the heating elements (28). This particular description of a fluid heater (22) is not intended to limit the invention to any particular device or method of increasing the temperature of the fluid (17); and any manner increasing the temperature of the fluid (17) can be utilized to satisfy a particular application. An energy source (37) for operation of the control system (31), the heating elements (28), and the fluid flow generator (32) can take the form of alternating current, direct current, a battery, or the current provided by an interconnected network for delivering electricity to an electrical outlet, or generated by a generator, alternator, or the like.

As to certain embodiments, the fluid heater (22) can heat a flow of air (76) which can be delivered to the outlets (15) of the carrier (6).

Now referring primarily to FIG. 8, as a second non-limiting example, the fluid heater (22) can take the form of a catalyst bed (38) fluidicly coupled between the fluid source and the plurality of outlets (15) of the carrier (6). The catalyst bed (38) having an internal surface which supports a catalyst ( ) in the form of a group 7, 8, 9, 10 or 11 transition metal. The fluid (17) delivered from the fluid source (can be in the form of a mixture of peroxide and an organic compound in a ratio from about 0.2:1 to about 6:1. The reaction can be exothermic, so after the reaction has started it may continue with little or no additional heat input. The catalyst bed (38) can achieve temperatures of between about 150° C. and 250° C. with the products of water, hydrogen, carbon dioxide, and carbon monoxide in the form of heated gases or heated liquid vapor. See for example, Patent Cooperation Treaty Publication WO 2007/015070, hereby incorporated by reference to the extent necessary to enable the catalyst bed (38) and the fluid (17) in the form of a mixture of peroxide and an organic compound which reacts exothermically upon contact with the catalyst bed.

Now referring primarily to FIGS. 1 and 2, the fluid (17) can be delivered from the fluid source (18) by a fluid flow generator (32). The fluid flow generator can for example take the form of a submersible pump located inside of the fluid source (18)(as shown for example in FIG. 2) or a pump located outside of the fluid source (18) (as shown for example in FIG. 3).

Now referring primarily to FIG. 3, the fluid source (17) can take the form of a fluid source housing (33) configured to matingly receive a fluid container (34) (whether refillable or disposable). Typically, the fluid container (34) contains an amount of fluid (17) and upon being matingly received by the fluid source housing (33) becomes fluidicly coupled to the flow path which delivers an amount of fluid (17) to the plurality of outlets (15) of the carrier (6). As to certain embodiments of the fluid container (34) can provide a plurality of fluid chambers (36) each separately delivering an amount of fluid (whether the same or different) which can be proportionally mixed and delivered from the fluid source (18). The fluid container (34) can be removed and serially replaced by additional fluid containers (34) which contain the same or different fluids (17) or fluid mixtures. An auxiliary fluid port (35) can be fluidicly coupled to the fluid flow path between the fluid source (18) and the plurality of outlets (15).

As can be easily understood from the foregoing, the basic concepts of the present invention may be embodied in a variety of ways. The invention involves numerous and varied embodiments of an inventive wiper and methods making and using the inventive wiper including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a wiper" should be understood to encompass disclosure of the act of "wiping"—whether explicitly discussed or not—and, conversely, were there effectively disclosure of the act of "wiping", such a disclosure should be understood to encompass disclosure of "wiper" and even a "means for wiping." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

For the purposes of the present invention, ranges may be expressed herein as from "about" one particular value to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Unless otherwise expressly described embodiments of the invention occur within the range in increments of five percent. In the absence of any express written value, "about" means within +/−10 percent of the numerical value indicated.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the surface wiper systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:
1. A wiper, comprising:
   a carrier enclosing a hollow passage, said carrier including:
      a pair of blade supports extending in generally parallel relation along a longitudinal length of said carrier;
      a pair of blades correspondingly disposed in said pair of blade supports;
      a plurality of outlets which communicates between said hollow passage and a location on the external surface of said carrier, said plurality of outlets periodically located between said pair of blade supports along said longitudinal length of said carrier;

a first end piece coupled to a first end of said carrier and a second end piece coupled to a second end of said carrier;

a fluid source configured to contain an amount of fluid, said fluid source fluidically coupled to said hollow passage in said carrier;

a fluid flow generator fluidically coupled to said fluid source capable of generating a flow of said amount of fluid between said fluid source and said plurality of outlets of said carrier; and a vacuum generator capable of generating a vacuum at said plurality of outlets to collect said amount of fluid.

2. The wiper of claim 1, further comprising a fluid heater fluidically coupled to said fluid source capable of controlling temperature of said amount of fluid.

3. The wiper of claim 2, wherein said amount of fluid can be sufficiently heated to be dispersed from said plurality of outlets of the carrier as a heated gas.

4. A wiper, comprising:

a carrier enclosing a hollow passage, said carrier including:
 a pair of blade supports extending in generally parallel relation along a longitudinal length of said carrier;
 a pair of blades correspondingly disposed in said pair of blade supports; and
 an airfoil to distribute air flow about the carrier in manner which directs aerodynamic forces through the carrier to said pair of blades.

5. The wiper of any one of claim 1 or 4, wherein said carrier comprise a resilient flexible material having a resiliently flexible curvature between a first carrier end and a second carrier end to allow the sweeping surface said pair of blades to flexibly conform in wiping engagement with a wipeable surface in response to forcible urging upon a central portion of said carrier.

6. A wiper, comprising:

a carrier enclosing a hollow passage, said carrier including:
 a pair of blade supports extending in generally parallel relation along a longitudinal length of said carrier;
 a pair of blades correspondingly disposed in said pair of blade supports;
  wherein said carrier comprise a resilient flexible material having a resiliently flexible curvature between a first carrier end and a second carrier end to allow the sweeping surface said pair of blades to flexibly conform in wiping engagement with a wipeable surface in response to forcible urging upon a central portion of said carrier.

7. The wiper of any one of claim 4 or 6, further comprising a plurality of outlets periodically located between said pair of blade supports along said longitudinal length of said carrier.

8. The wiper of claim 7 further comprising:

a first end piece coupled to a first end of said carrier; and a second end piece coupled to a second end of said carrier.

9. The wiper of claim 8, further comprising a fluid source configured to contain an amount of fluid, said fluid source fluidically coupled to said hollow passage in said carrier.

10. The wiper of claim 9, further comprising a fluid flow generator fluidically coupled to said fluid source capable of generating a flow of an amount of fluid between said fluid source and said plurality of outlets of said carrier.

11. The wiper of claim 10, further comprising a vacuum generator fluidically coupled to said plurality of outlets to collect said amount of fluid.

12. The wiper of claim 10, further comprising a fluid heater fluidically coupled to said fluid source capable of controlling temperature of said amount of fluid.

13. The wiper of claim 12, wherein said amount of fluid can be sufficiently heated to be dispersed from said plurality of outlets of the carrier as a heated gas.

14. The wiper of any one of claim 1 or 6, further comprising an airfoil to distribute air flow about the carrier in manner which directs aerodynamic forces through the carrier to said pair of blades.

15. The wiper of any one of claim 1, 4 or 6, further comprising a wiper arm joined proximate a first end to said carrier, said wiper arm joined proximate a second end to a movement assembly configured to allow wiping engagement of said sweeping surface with a wipeable surface during operation of said movement assembly.

16. The wiper of claim 15, wherein said wiper arm joined by a pivot at said first end to said carrier, said pivot having a location generally on center of a longitudinal axis of said carrier.

* * * * *